US009229989B1

(12) United States Patent
Jain et al.

(10) Patent No.: US 9,229,989 B1
(45) Date of Patent: *Jan. 5, 2016

(54) USING RESOURCE LOAD TIMES IN RANKING SEARCH RESULTS

(71) Applicant: Google Inc., Mountain View, CA (US)

(72) Inventors: Arvind Jain, Los Altos, CA (US); Sreeram Ramachandran, Cupertino, CA (US)

(73) Assignee: Google Inc., Mountain View, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/143,190

(22) Filed: Dec. 30, 2013

Related U.S. Application Data (63) Continuation of application No. 12/945,769, filed on Nov. 12, 2010, now Pat. No. 8,645,362.

(51) Int. Cl.
*G06F 7/00* (2006.01)
*G06F 17/30* (2006.01)

(52) U.S. Cl.
CPC ...... *G06F 17/3053* (2013.01); *G06F 17/30522* (2013.01); *G06F 17/30867* (2013.01)

(58) Field of Classification Search
CPC .................. G06F 17/30867; G06F 17/30522
See application file for complete search history.

(56) References Cited

U.S. PATENT DOCUMENTS

| | | | |
|---|---|---|---|
| 2003/0061283 A1* | 3/2003 | Dutta et al. | 709/204 |
| 2005/0038631 A1* | 2/2005 | Steinke | 702/182 |
| 2006/0242129 A1* | 10/2006 | Libes et al. | 707/3 |
| 2007/0250468 A1* | 10/2007 | Pieper | 707/1 |
| 2009/0006398 A1* | 1/2009 | Lam et al. | 707/7 |
| 2011/0053513 A1* | 3/2011 | Papakostas et al. | 455/63.1 |
| 2011/0083078 A1* | 4/2011 | Ju | 715/738 |
| 2012/0084346 A1* | 4/2012 | Mickens | 709/203 |

* cited by examiner

*Primary Examiner* — Charles Lu
(74) *Attorney, Agent, or Firm* — Fish & Richardson P.C.

(57) ABSTRACT

Methods, systems, and apparatus, including computer programs encoded on a computer storage medium, for using resource load times in ranking search results. In one aspect, a method includes receiving a search query from a particular user device; receiving, for each of a plurality of resources responsive to the search query, a respective first score; accessing load time data that specifies, for each of the plurality of resources, a load time measure for the resource; and adjusting the first score for each of the plurality of resources based on the load time measure for the resource to generate a second score for each of the plurality of resources.

18 Claims, 5 Drawing Sheets

USING RESOURCE LOAD TIMES IN RANKING SEARCH RESULTS

CROSS-REFERENCE TO RELATED APPLICATION

This application is a continuation application of U.S. patent application Ser. No. 12/945,769, filed Nov. 12, 2010, the disclosure of which is hereby incorporated by reference in its entirety.

BACKGROUND

This specification relates to search systems.

The Internet provides access to a wide variety of resources, examples of which include video or audio files, web pages for particular subjects, book articles, and news articles. A search engine can identify resources in response to a user query that includes one or more search terms or phrases. The search engine ranks the resources based on their relevance to the query and importance and provides search results that link to the identified resources.

The resources referred to by the search results may take different amounts of time to load in users' web browsers. For example, for any particular resource, the size of the resource, the number of images the resource includes or references, the web server that serves the resource, and the particular network connection can impact the amount of time the resource takes to load in a user's web browser. Given two resources that are of similar relevance to a search query, a typical user may prefer to visit the resource having the shorter load time.

SUMMARY

This specification describes technologies relating to using resource load times in ranking search results.

In general, one innovative aspect of the subject matter described in this specification can be embodied in methods that include the actions of receiving a search query from a particular user device; receiving, for each of a plurality of resources responsive to the search query, a respective first score; accessing load time data that specifies, for each of the plurality of resources, a load time measure for the resource; and adjusting the first score for each of the plurality of resources based on the load time measure for the resource to generate a second score for each of the plurality of resources. Other embodiments of this aspect include corresponding systems, apparatus, and computer programs, configured to perform the actions of the methods, encoded on computer storage devices.

These and other embodiments can each optionally include one or more of the following features. Providing search results to the particular user device, each search result corresponding to one of the resources, for presentation in an order according to the second scores of the resources corresponding to the search results. Making further adjustments to the second scores before providing the search results to the particular user device. For each resource, the load time measure for the resource comprises a statistical measure of a sample of load times for the resource obtained from a plurality of user devices. The statistical measure is a central tendency of the sample.

Each of the plurality of user devices shares at least one attribute with the particular user device and wherein the at least one shared attribute comprises a location of the particular user device. The location of the particular user device is a country from which the search query originates. Each of the plurality of user devices shares at least one attribute with the particular user device and wherein the at least one shared attribute comprises an agent type of the particular user device.

Identifying one or more of the plurality of user devices that share at least one attribute with the particular user device, where the at least one shared attribute comprises an agent type of the particular user device or a location of the particular user device. Computing a new load time measure using only load times from the identified one or more user devices. Adjusting the first score for each of the plurality of resources comprises for each of the resources, computing a multiplier factor for the resource based on the load time measure for the resource; and, for each of the resources, modifying the first score of the resource by the multiplier factor to generate the second score.

Computing the multiplier factor for a particular resource comprises determining whether the load time measure for a particular resource exceeds a first threshold value; and if the load time measure for the particular resource exceeds the first threshold value, setting the multiplier factor for the particular resource to a first value. Computing the multiplier factor for a particular resource further comprises if the load time measure for the particular resource does not exceed the first threshold value, determining whether the load time measure for the particular resource exceeds a second threshold value; and if the load time measure for the particular resource exceeds the second threshold value, setting the multiplier factor for the particular resource to a second value.

In general, another aspect of the subject matter described in this specification can be embodied in methods that include the actions of collecting load time data from each of a plurality of user devices and each of a plurality of resources, the load time data specifying, for each of the user devices and for each of the plurality of resources, a time the resource took to load on the user device, and, for each resource, aggregating the load time data for the resource to generate a load time measure for the resource, the load time measure being a statistical measure of the time the resource took to load on the plurality of user devices. Other embodiments of this aspect include corresponding systems, apparatus, and computer programs, configured to perform the actions of the methods, encoded on computer storage devices.

These and other embodiments can each optionally include one or more of the following features. The load time data for the user devices is collected from one or more of a web browser, a web browser add-on, or monitoring software associated with the particular user device. The load time measure is a central tendency of load times from the plurality of user devices. The operations further comprising identifying one or more of the plurality of user devices having a specific attribute, the one or more of the plurality of user devices being less than all of the plurality of user devices; and generating a new load time measure for each of the resources, the load time measure being generated using only load time data from the one or more identified user devices. The specific attribute is an agent type. The specific attribute is a location of the user device. The operations further comprising providing the load time measure for each resource to a search engine.

Particular embodiments of the subject matter described in this specification can be implemented so as to realize one or more of the following advantages. A search result for a resource having a short load time relative to resources having longer load times can be promoted in a presentation order, and search results for the resources having longer load times can be demoted. The demotion can, in some situations, result in a search result for a resource having a short load time being presented earlier in the order than a search result for a similarly-relevant resource having a longer load time. Thus, for two resources that, apart from load times, appear to equally satisfy a user's informational needs, the user will often select the resource that will likely load the most quickly of the two, resulting in a better user experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
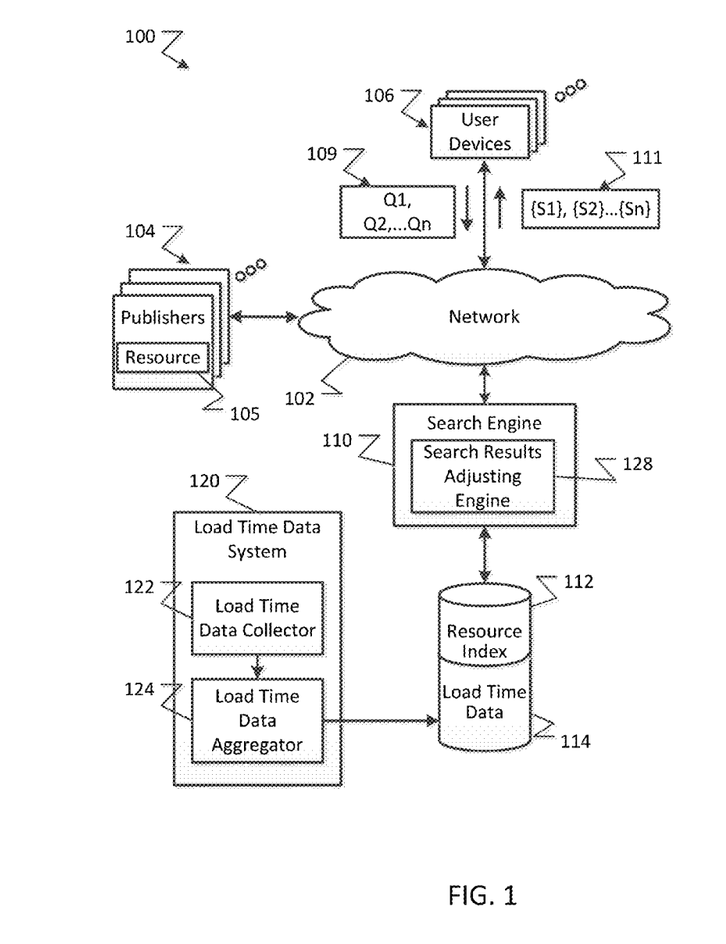
FIG. 1 is a block diagram of an example environment in which a load time data system can be used.

FIG. 1 is a block diagram of an example environment 100 in which a load time data system 120 can be used. A computer network 102, e.g., a local area network (LAN), wide area network (WAN), the Internet, or a combination thereof, connects web sites 104, user devices 106, and a search engine 110. The environment 100 may include many thousands web sites 104 and user devices 106.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web agent (browser) or other communication software, to facilitate the sending and receiving of data over the network 102.

A web site 104 is one or more resources 105 associated with a domain name, and one or more servers host each web site. Respective publishers and/or advertisers, i.e., entities that manage and/or own the web sites 104, maintain the web sites 104.

A resource 105 is any data that can be provided by the web site 104 over the network 102 and that is associated with a resource address. Resources include HTML pages, word processing documents, portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

To facilitate searching of these resources, the search engine 110 crawls the web sites 104 and indexes the resources 105 that the web sites 104 host. The indexed and, optionally, cached copies of the resources are stored in a resource index 112.

The user devices 106 submit search queries 109 (Q1, Q2 ... Qn) to the search engine 110. In response, the search engine 110 uses the resource index 112 to identify resources that are relevant to the queries. The search engine 110 identifies the resources in the form of search results 111 and returns the search results 111 to the user devices 106 in search results pages ({S1}, {S2} ... {Sn}).

A search result 111 is data generated by the search engine 110 that identifies a resource that satisfies a particular search query, and includes a resource locator for the resource. An example search result 111 can include a web page title, a snippet of text extracted from the web page, and the URL of the web page. The search results are ranked (i.e., placed in an order) according to respective scores determined for each of the resources identified by the search results. The scores generally relate to both the quality and the relevance of the corresponding resource. The search results 109 are provided to the user device according to the ranking.

The user devices 106 receive the search results pages and render the pages for presentation to users. In response to the user selecting a search result at a user device 106, the user device 106 requests the resource identified by the resource locator included in the selected search result. The web site 104 hosting the resource receives the request for the resource from the user device 106 and provides the resource to the requesting user device 106.

In some implementations, the load time of each particular resource is an additional signal that the search engine 110 uses when evaluating a resource for a search query. As used herein, the term "load time" refers to the time that elapses between an initial request for a resource and at least the time that data to completely render the resource is provided to a device that requested the resource. The load time can vary, depending on the particular metrics used. For example, the time that elapses between the time that a user device 106 requests a resource and the time that the resource is presented in a web browser on the user device can be defined as the load time. Alternatively, the time that elapses between the time that a web server 104 hosting a resource receives a request for the resource and the time that the resource is presented in a web browser on the user device can be defined as the load time.

The load time can vary depending on one or more of the user device 106, the resource 105 that is being requested, the web server 104 that is serving the resource, and the network connections. In particular, the load time for a resource may depend on the amount of content included in the resource (e.g., the number of images or embedded instructions included in the resource), the web server(s) hosting the resource, the current network connectivity of the user device requesting the resource, etc. For example, a resource that includes multiple embedded videos may have a longer load time than a resource that does not include any images or embedded videos. Furthermore, a resource hosted by a web server in France may load faster on a user device in France than on a user device in the United States.

The search engine 110 can use data that specifies the load times for resources in various search-related operations. One example operation is reordering search results from a first order to a second order. For example, if two search results are adjacent to each other in the first order (e.g., their respective underlying resources are initially scored such that the search results are adjacent in an order), and the resource referenced by the second search result has a significantly shorter load time relative to the resource referenced by the first search result, the search engine 110 will adjust the search results to a second order so that the second search result is before the first search result in the order. This can improve the user experience, as it is likely that a user would prefer to access the resource that loads with the least amount of delay.

The search engine 110 includes, or is in data communication with, a load time data system 120 that collects and aggregates data about the load times of resources 105 on user devices 106 over the network 102. In some implementations, in order to protect user privacy, the load time data is anonymized to remove any user-identifying information so that the resources provided to user devices and their load times on the user devices cannot be associated with a particular user or user identifier. In some implementations, the load time data system 120 includes a load time data collector 122 and a load time data aggregator 124. The partitioning of the functionality of load time data system 120 between the load time data collector 122 and the load time data aggregator 124 is illustrative only. Additional partitioning of the functions described below can be implemented, or, alternatively, the load time data system 120 can be a single software engine that performs all the functions described below.

In some implementations, the load time data collector 122 receives load time data from user devices 106 over the network 102. For example, for each resource accessed by user device 106 using a web browser, the web browser can determine the time the resource took to load on the user device. The web browser can then send the load time data to load time data system 120, where it is collected by the load time data collector 122. Alternatively, a browser add-on can observe the time a resource takes to load in the web browser and send it to load time data system 120. This browser add-on can be a browser toolbar that adds additional functionality to the browser interface. In some implementations, the browser or add-on will monitor load times and send them to the load time data system 120 only if the user opts-in (i.e, agrees to report their load times). In some implementations, network monitoring software associated with a user device 106 monitors communications between the user device 106 and the network 102. The network monitoring software may be installed on user device 106 or on another device in the network 102. As part of monitoring network traffic, the network monitoring software can record load times for resources on the user device 106 and send the recorded load times to the load time data collector 122. In some implementations, the user devices 106 store the load time data in a local store and send the stored data to the load time data system 120 at pre-determined intervals. Alternatively, the user devices 106 may send the load time data to the load time data system 120 immediately after a resource has finished loading on the user device. The collector 122 receives load time data from user devices 106 over the network 102.

For each resource 105, the load time data collector 122 receives load time data for the resource from multiple user devices 106. In some implementations, because the load time is dependent on user device-specific factors like the agent used to request and display the resource and the network connectivity of the user device, the load time data collector 122 also derives or receives data identifying attributes of each user device providing load time data. The identified attributes can include the agent type (e.g., web browser version) and the location (e.g., the country) of the user device. In some implementations, the load time data collector 122 only collects load times from certain types of devices. For example, load times may not be collected from mobile devices because of the high latency of all requests for resources on such devices. In some implementations, the load time data collector 122 anonymizes the identified attributes of the user devices for privacy protection. This ensures that attributes of a particular user device are not associated with or able to identify a particular user or their navigational history.

In other implementations in which the load time is measure relative to a web server only, an agent (or other software) can be installed at each publisher 104, and can monitor the time required to serve a requested resource in response to a request. The time can be included as a resource tag or query parameter, and can be reported by the requesting user device to the load time data collector 122. Alternatively, virtual machines implemented as part of the load time data system can be used to request the resources.

Load time data aggregator 124 aggregates the load time data collected by load time collector 122. Load time data aggregator 124 can generate a load time measure for a resource 105 that specifies the time the resource takes to load on user devices 106. In some implementations, the load time measure is a statistical measure (e.g., a central tendency) of the load times of the resource collected by the load time data collector 122. Depending on the implementation, the central tendency may be a mean, trimmed mean, Winsorized mean, median, median of sample medians, etc.

In some implementations, the load time data aggregator 124 may generate multiple load time measures for a resource 105 based on attributes of the user devices providing the load time data. In addition to, or in place of, the load time measure that is generated using all of the collected page load time data for a resource, the load time data aggregator 124 can generate one or more load time measures using only data from user devices that share at least one attribute. In one example, the load time data aggregator 124 can generate a first load time measure for a particular resource using only load times from user devices in the United States, a second load time measure using load times from user devices in France, a third load time measure using load times from user devices in Germany, etc. Alternatively, the load time data aggregator 124 can generate separate load time measures for each identified agent type; each identified network connection, and so on. The identified network connection can be a type of network connection used by a user device to access the resource. In some implementations, generating load time measures based on multiple attributes (e.g., a load time measure using only load time data from devices that use a first agent type and are in the United States) is also done.

In some implementations, the load time data aggregator 124 determines whether sufficient load time data has been collected for a load time measure to be statistically significant before generating the load time measure. For example, load time data aggregator 124 can determine whether the number of user devices reporting load time data for the resource exceeds a specified threshold value before generating the load time measure. Some resources 105 may not have enough traffic from particular locations or types of devices for load time measures derived from devices sharing a particular attribute to be meaningful. For example, resources in Chinese may not have enough visits from user devices located in France to generate a meaningful load time measure using solely devices from France, or a newly launched website may not have sufficient load time data associated with its resources.

Once the load time measures for a resource are generated, data including the load time measures is associated with the resource locator for the resource in the resource index 112 as load time data 114. Accordingly, by accessing the resource index 112, the search engine 110 can access the load time measures for the resource referenced by a particular resource locator.

In some implementations, load times for resources associated with the same domain name (e.g., www.example.com/resource1.html, www.example.com/resource2.html, . . .

www.example.com/resourceN.html) can all be assigned the same load time measure based on the load time statistics of the resources, and the load times for the resources are thus resolved to a domain level. Other ways of attributing load times to resources can also be used.

Figure 2:
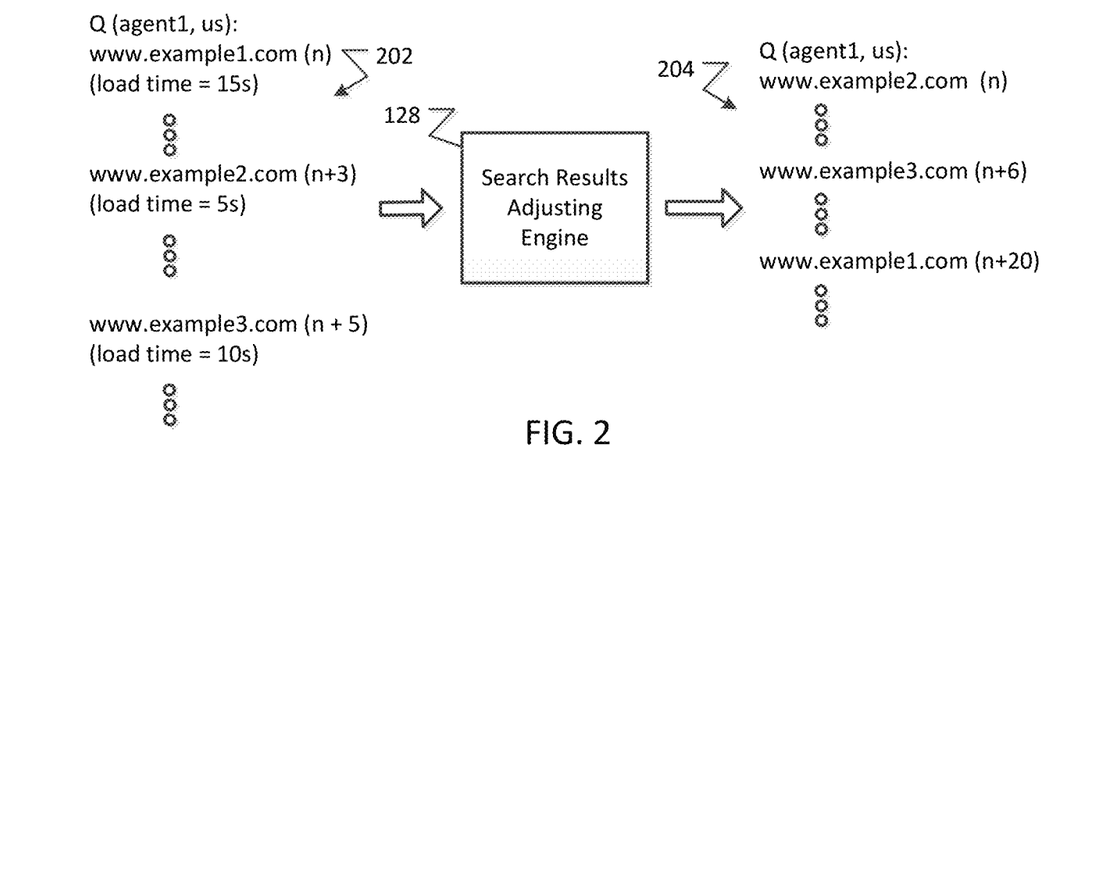
FIG. 2 is a block diagram illustrating a process flow of a search results adjusting engine.

FIG. 2 is a block diagram illustrating a process flow of a search results adjusting engine 128. The load time measures of resources referenced in search results responsive to a query are used to compute multiplier factors for the search results. The search results adjusting engine 128 adjusts the order of the search results based on these multiplier factors, as described below.

At query time, the search results adjusting engine 128 receives search results responsive to the query. Each search result includes a resource locator referencing a resource and is associated with an initial score for the result. For each search result including a resource locator associated with load time data in the resource index 112, the search results adjusting engine 128 computes a multiplier factor for the search result. Each multiplier factor is a measure of the effect the load time of the resource will have on the initial score of the search result and is dependent on a load time measure for the resource referred to by the search result. The search results adjusting engine 128 applies the multiplier factor for each search result to the initial score for the search result (i.e., multiplies the initial score for the search result by the multiplier factor for the search result) to generate a load-adjusted score. The search results can then be ranked according to their load-adjusted scores. Alternatively, an additive factor for each result can be determined based on the load time measures. The additive factors can then be added to each initial score to generate the load-adjusted scores.

As described above, attributes of the user device submitting the query can affect the load times of resources on the user device. Thus, in some implementations, the multiplier factor is based in part on device attributes of the user device 106 submitting the query (i.e., the current user device). The device attributes can include an agent type of the agent used to submit the query and the country of the current user device. The device attributes can also include the type of network connection currently being used by the user device. These device attributes are derived from or provided by the current user device. Alternatively, the device attributes can be obtained from account data associated with the user of the current user device. The device attributes of the current device can also be anonymized so that they cannot identify or be associated with a user of the current user device. In some implementations, once the results adjusting engine 128 obtains the desired device attributes of the current user device, it can access a load time measure compiled using only load times from user devices sharing at least one of the desired attributes with the user device submitting the query. Alternatively, the search results adjusting engine 128 can access general load time data for a resource and determine which of the user devices used to compile the load time data share at least one desired attribute with the current user device. The search results adjusting engine 128 can then generate a new load time measure using only load times from the identified user devices.

In some implementations, the search results adjusting engine 128 compares the load time measures for search results to threshold values to generate the multiplier factor. Specifically, the search results adjusting engine 128 can compare the load time measure to a first threshold value. If the load time measure exceeds the first threshold value, the search results adjusting engine 128 sets the multiplier factor to a first demotion value. In one implementation, if the load time measure does not exceed the first threshold value, the search results adjusting engine 128 compares the load time measure to a second threshold value. If the load time measure exceeds the second value, the multiplier factor is set to a second demotion value. If the load time measure does not exceed either threshold value, the multiplier factor is set to equal 1. More thresholds and corresponding demotion values can be used for greater granularity. Alternatively, continuous functions that asymptotically approach a maximum or minimum demotion value can be used.

The threshold values can be determined using a sample of all collected page load times. For example, the first threshold value can be any value in a range of values corresponding to the $96^{th}$ percentile of all collected page load times to the $99^{th}$ percentile of all collected page load times. The second threshold value is lower than the first threshold value and can be any value in a range of values corresponding to the $85^{th}$ percentile of all collected page load times to the $95^{th}$ percentile of all collected page load times. Alternatively, other ranges can be used. The demotion values can be adjusted in accordance with the desired effect on search result scores, with the first demotion value being lower than the second demotion value to further demote resources with extremely low load times.

Alternatively, the search results adjusting engine 128 can promote search results with shorter load times by comparing the load time measures for resources to a different threshold value (e.g., any value in the range of the $5^{th}$ percentile of all collected page load time values to the $15^{th}$ percentile of all collected page load time values), and setting the multiplier factor equal to a promotion value if the load time measure is below the threshold value.

In some implementations, particular search results are not subject to being promoted or demoted (i.e., their multiplier factor is set to 1) no matter their load time measure. For instance, search results whose load time measure is based on too few data points (e.g., the load time measure is based on less than 1000 reported load times), search results that have relevancy scores exceeding a certain threshold value, search results corresponding to a resource that is a home page of a web site, and search results for navigational resources can all have their multiplier factor set to 1 regardless of their load time measure. Similarly, load times can be ignored for certain queries, such as queries that are determined to be directed to obtaining particular information (e.g., navigational queries, news queries, weather queries, etc.).

Additionally, the search results adjusting engine 128 can apply the same multiplier factor to groups of related resources. For example, all resources from the same host may be demoted or promoted by the same factor in order to preserve the relative order of results from the host. Furthermore, all resources included in the same web site, having the same domain, or sharing an IP address can be assigned the same multiplier value. Various techniques may be used to determine which multiplier value to apply, including demoting or promoting each group of related resources based on the smallest or largest load time measure of any resource in the group. In some implementations, an average multiplier value for the group of related resources can be computed based on the individual multiplier values for each related resource.

Other implementations of the systems and techniques for using resource load times in ranking search results are possible. In some implementations, a load time for a particular resource on a particular user device can be predicted using a model that has as its input information about the resource, e.g., size of the resource, web server hosting the resource, etc., and, optionally, attributes of the user device. The model can be developed using conventional machine learning techniques, e.g., using a data set where the output and input are known to train the model. The predicted load time can then be used in place of the load time measure to generate the multiplier factor. Alternatively, the model can use the load time measure for the resource as an input to generate the predicted load time.

Once the load-adjusted scores for each of the search results have been generated by search results adjusting engine 128, the search engine 110 reorders the search results according to the load-adjusted scores of the resources corresponding to the search results. The search engine 110 can provide the search results to a user device 106. Alternatively, further adjustments based on other factors can be made to the load-adjusted scores before the load-adjusted scores are used to order the search results for presentation on the user device.

An example adjustment is illustrated in FIG. 2. As shown in FIG. 2, a query provided from a user device in the United States (us) and submitted using an agent having an agent ID of agent1, is received by the search engine 110 and the search engine 110 provides search results 202 ranked according to a first order. Some of the resources referenced by the search results 202 are associated with a load time measure (www.example1.com has a load time measure of 15 seconds, www.example2.com has a load time measure of 5 seconds, and www.example3.com has a load time measure of 10 seconds). In some implementations, the load time measure is generated using only load times from user devices in the United States and/or using the agent having the agent type agent1. The search results adjusting engine uses the load time measures to generate a multiplier factor for each search result. The multiplier factor is applied to an initial score used to generate the first ranking to obtain a load-adjusted score for each search result. The load-adjusted scores are then ranked according to a second order 204 based on the second scores.

In the example adjustment illustrated in FIG. 2, a first threshold value is set at 12 seconds and a second threshold value is set at 9 seconds. Because the load time measure for www.example1.com (15 s) exceeds the first threshold, the initial score for the search result referencing www.example1.com is adjusted by a first demotion value. The load time measure for www.example2.com (5 s) does not exceed either threshold value, and thus the initial score for that search result remains unchanged. The load time measure for www.example3.com (10 s) exceeds only the second threshold value and the initial score for that search result is adjusted by a second demotion value. In the ranking based on the load-adjusted scores, the search result www.example2.com is promoted to the position previously occupied by the search result www.example1.com (e.g., position n) and the search results www.example3.com and www.example1.com are demoted to positions n+6 and n+20, respectively, because of the applied demotion values.

Figure 3:
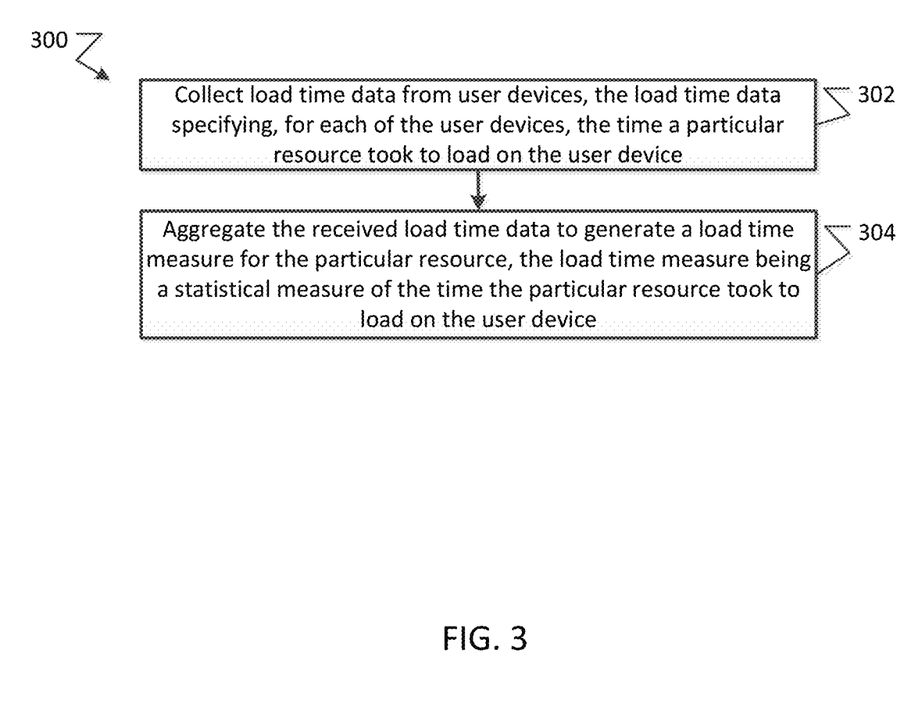
FIG. 3 is a flow diagram of an example process for generating a load time measure for a particular resource.

FIG. 3 is a flow diagram of an example process 300 for generating a load time measure for a particular resource. The load time data system 120 of FIG. 1 can be used to perform the process 300.

The load time data system 120 collects load time data from user devices, the load time data specifying, for each of the user devices, the time a particular resource took to load on the user device (302). For example, the load time data system 120 can collect the load time data system 120 over a network 102 from web browsers, web browser add-ons or network monitoring software associated with the user devices 106. The load time data system 120 can receive user device attributes along with the load time data.

The load time data system 120 aggregates the received load time data to generate a load time measure for the particular resource (304), the load time measure being a statistical measure of the time the particular resource took to load on the user device. For example, the load time measure can be a central tendency, e.g., a mean, of the collected load times for the particular resource. In some implementations, the load time data system 120 identifies attributes of the user devices providing the load time data and generates multiple load time measures for the resource, each load time measure using only load times from user devices sharing at least one attribute. In some implementations, the load time data system 120 determines whether to compute a load time measure for the particular resource based on whether sufficient load time data exists for the resource (e.g., whether the number of user devices providing load times for the particular resource exceeds a threshold value).

Figure 4:
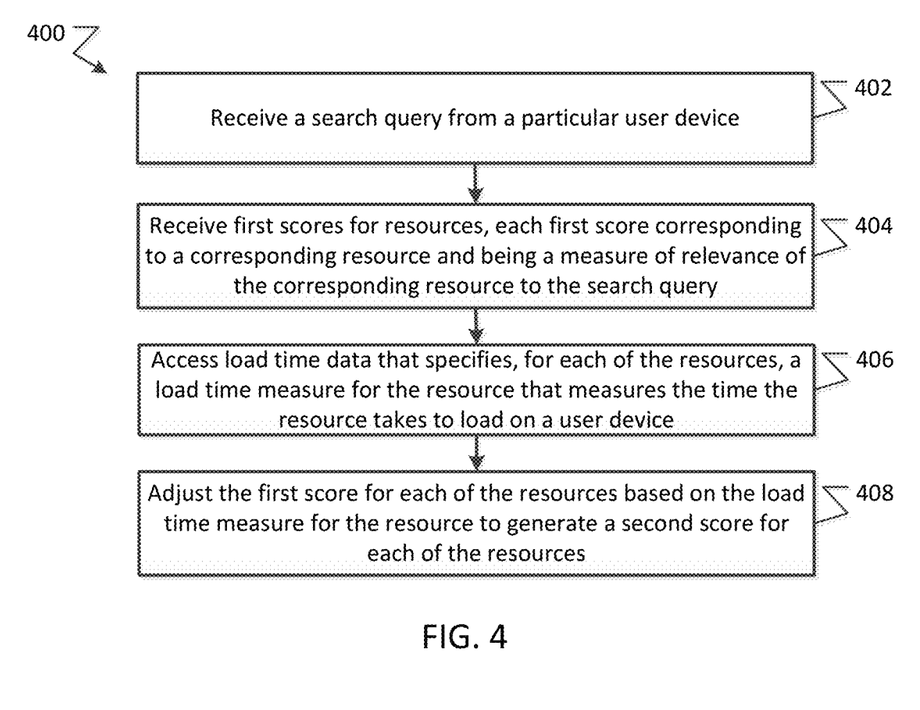
FIG. 4 is a flow diagram of an example process for adjusting an order of search results based on resource load times.

FIG. 4 is a flow diagram of an example process 400 for adjusting an order of search results based on resource load times. The search results adjusting engine 128 of FIG. 1 can be used to perform the process 400.

The search results adjusting engine 128 receives a search query from a particular user device (402). In some implementations, the search results adjusting engine 128 also receives or obtains attributes of the particular user device.

The search results adjusting engine 128 also receives initial scores for resources, each initial score corresponding to a corresponding resource and being a measure of relevance of the corresponding resource to the search query (404). For example, the search results adjusting engine 128 can receive the initial scores from the search engine 110.

The search results adjusting engine 128 accesses load time data that specifies, for each of the resources, a load time measure for the resource that measures the time the resource takes to load on a user device (406). For example, the load time measure can be a central tendency of load times of the resource from a sample of user devices. In some implementations, the load time measure is compiled using only load time data from user devices that share at least one attribute (e.g., location or agent type) with the particular user device. Alternatively, the search results adjusting engine 128 can generate a new load time measure that uses only data from user devices sharing at least one attribute with the particular user device as described above. The load times can be on a per-resource basis, or on a per-domain basis.

The search results adjusting engine 128 adjusts the initial score for each resource based on the load time measure for the resource to generate a load-adjusted score for each resource (408). For example, the search results adjusting engine 128 can compute a multiplier factor for each resource. The multiplier factor can be computed based on a comparison of the load time measure for the resource to one or more pre-defined threshold values. The multiplier factor is then applied to the initial score for the resource to generate the load-adjusted score.

Figure 5:
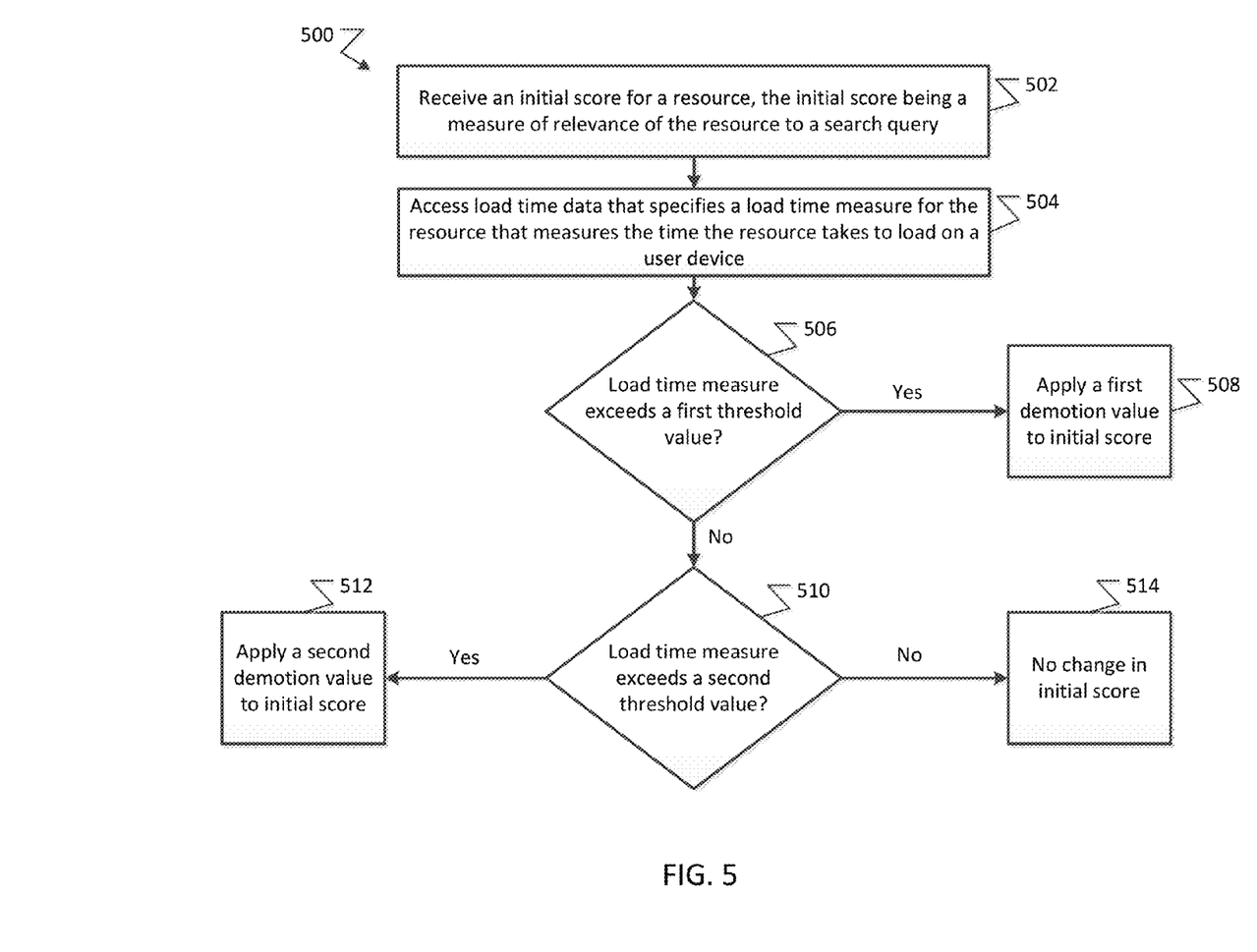
FIG. 5 is a flow diagram of an example process for adjusting an initial score of a resource based on the load time measure for the resource.

FIG. 5 is a flow diagram of an example process 500 for adjusting an initial score of a resource based on the load time measure for the resource. The search results adjusting engine 128 of FIG. 1 can be used to perform the process 500.

The search results adjusting engine 128 receives a first score for the resource, the initial score being a measure of relevance of the resource to a search query (502). The search results adjusting engine 128 accesses load time data that specifies a load time measure for the resource that measures the time the resource takes to load on user devices (504).

The search results adjusting engine 128 determines whether the load time measure exceeds a first threshold value (506), and if it does, a first demotion value is applied to the initial score for the resource (508). If the load time measure does not exceed the first threshold value, the results adjusting engine 128 determines whether the load time measure exceeds a second threshold value (510). If the load time measure exceeds the second threshold value, a second demotion value is applied to the initial score (512). Otherwise, no change is made to the initial score for the resource (514).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a search query from a particular user device;
   identifying one or more attributes of the particular user device;
   receiving, for each of a plurality of resources responsive to the search query, a respective first score;
   accessing load time data that specifies, for each of the plurality of resources, a load time measure for the resource, wherein the load time measure for the resource is a statistical measure of a sample of load times for the resource compiled using only load times from user devices sharing at least one of the one or more attributes with the particular user device;
   generating a respective second score for each of the plurality of resources, wherein generating the respective second score for each of the plurality of resources comprises adjusting the first score for the resource based on the load time measure for the resource to generate the second score for the resource, comprising, for a first resource of the plurality of resources:
      determining that the load time measure for the first resource of the plurality of resources is in a percentile that exceeds a first percentile of load times in a sample of collected load times for resources in a resource index, and
      in response to determining that the load time measure for the first resource is in a percentile that exceeds the first percentile, adjusting the first score for the first resource by applying a first multiplier factor to the first score; and
   providing a search results page including search results to the particular user device, wherein each search result corresponds to a respective one of the resources, and wherein the search results are ordered based on the second scores of the resources corresponding to the search results.

2. The method of claim 1, further comprising:
   making further adjustments to the second scores before providing the search results page to the particular user device.

3. The method of claim 1, wherein the statistical measure is a central tendency of the sample.

4. The method of claim 1, wherein the at least one shared attribute comprises a location of the particular user device.

5. The method of claim 4, wherein the location of the particular user device is a country from which the search query originates.

6. The method of claim 1, wherein the at least one shared attribute comprises an agent type of the particular user device.

7. The method of claim 1, wherein adjusting the first score for each of the plurality of resources comprises:
   for each of the resources, computing a multiplier factor for the resource based on the load time measure for the resource; and
   for each of the resources, modifying the first score of the resource by the multiplier factor to generate the second score.

8. The method of claim 7, wherein computing the multiplier factor for each of the resources comprises:
   determining whether the load time measure for the resource exceeds a first threshold value; and
   if the load time measure for the resource exceeds the first threshold value, setting the multiplier factor for the resource to a first value.

9. The method of claim 8, wherein computing the multiplier factor for each of the resources further comprises:
   if the load time measure for the resource does not exceed the first threshold value, determining whether the load time measure for the resource exceeds a second threshold value; and
   if the load time measure for the resource exceeds the second threshold value, setting the multiplier factor for the resource to a second value.

10. The method of claim 9, wherein the first threshold value represents the first percentile of load times in a sample of collected load times for resources in a resource index, and wherein the second threshold value represents a second percentile of load times in the sample of collected load times for resources in the resource index.

11. A system comprising:
one or more computers and one or more storage devices storing instructions that when executed by the one or more computers cause the one or more computers to perform operations comprising:
receiving a search query from a particular user device;
identifying one or more attributes of the particular user device;
receiving, for each of a plurality of resources responsive to the search query, a respective first score;
accessing load time data that specifies, for each of the plurality of resources, a load time measure for the resource, wherein the load time measure for the resource is a statistical measure of a sample of load times for the resource compiled using only load times from user devices sharing at least one of the one or more attributes with the particular user device;
generating a respective second score for each of the plurality of resources, wherein generating the respective second score for each of the plurality of resources comprises adjusting the first score for the resource based on the load time measure for the resource to generate the second score for the resource, comprising, for a first resource of the plurality of resources:
determining that the load time measure for the first resource of the plurality of resources is in a percentile that exceeds a first percentile of load times in a sample of collected load times for resources in a resource index, and
in response to determining that the load time measure for the first resource is in a percentile that exceeds the first percentile, adjusting the first score for the first resource by applying a first multiplier factor to the first score; and
providing a search results page including search results to the particular user device, wherein each search result corresponds to a respective one of the resources, and wherein the search results are ordered based on the second scores of the resources corresponding to the search results.

12. The system of claim 11, the operations further comprising:
making further adjustments to the second scores before providing the search results page to the particular user device.

13. The system of claim 11, wherein the statistical measure is a central tendency of the sample.

14. The system of claim 11, wherein adjusting the first score for each of the plurality of resources comprises:
for each of the resources, computing a multiplier factor for the resource based on the load time measure for the resource; and
for each of the resources, modifying the first score of the resource by the multiplier factor to generate the second score.

15. The system of claim 14, wherein computing the multiplier factor for each of the resources comprises:

determining whether the load time measure for the resource exceeds a first threshold value; and
if the load time measure for the resource exceeds the first threshold value, setting the multiplier factor for the resource to a first value.

16. The system of claim 15, wherein computing the multiplier factor for each of the resources further comprises:
if the load time measure for the resource does not exceed the first threshold value, determining whether the load time measure for the resource exceeds a second threshold value; and
if the load time measure for the resource exceeds the second threshold value, setting the multiplier factor for the resource to a second value.

17. The system of claim 16, wherein the first threshold value represents the first percentile of load times in a sample of collected load times for resources in a resource index, and wherein the second threshold value represents a second percentile of load times in the sample of collected load times for resources in the resource index.

18. A non-transitory computer storage medium encoded with a computer program, the program comprising instructions that when executed by one or more computers cause the one or more computers to perform operations comprising:
receiving a search query from a particular user device;
identifying one or more attributes of the particular user device;
receiving, for each of a plurality of resources responsive to the search query, a respective first score;
accessing load time data that specifies, for each of the plurality of resources, a load time measure for the resource, wherein the load time measure for the resource is a statistical measure of a sample of load times for the resource compiled using only load times from user devices sharing at least one of the one or more attributes with the particular user device;
generating a respective second score for each of the plurality of resources, wherein generating the respective second score for each of the plurality of resources comprises adjusting the first score for the resource based on the load time measure for the resource to generate the second score for the resource, comprising, for a first resource of the plurality of resources:
determining that the load time measure for the first resource of the plurality of resources is in a percentile that exceeds a first percentile of load times in a sample of collected load times for resources in a resource index, and
in response to determining that the load time measure for the first resource is in a percentile that exceeds the first percentile, adjusting the first score for the first resource by applying a first multiplier factor to the first score; and
providing a search results page including search results to the particular user device, wherein each search result corresponds to a respective one of the resources, and wherein the search results are ordered based on the second scores of the resources corresponding to the search results.

* * * * *